United States Patent [19]

Stauffer

[11] 4,247,763
[45] Jan. 27, 1981

[54] GRID SCAN RANGE FINDING APPARATUS

[75] Inventor: Norman L. Stauffer, Englewood, Colo.

[73] Assignee: Honeywell Inc., Minneapolis, Minn.

[21] Appl. No.: 35,172

[22] Filed: May 2, 1979

[51] Int. Cl.³ .............................................. G01J 1/36
[52] U.S. Cl. ..................................... 250/204; 350/314
[58] Field of Search ............... 250/201, 204, 216, 203, 250/209; 350/314; 354/25

[56] References Cited

U.S. PATENT DOCUMENTS

| 3,367,254 | 2/1968 | Townsley . |
| 3,499,711 | 3/1970 | Argyle . |
| 3,796,497 | 3/1974 | Mathisen et al. ............... 250/201 |
| 4,158,131 | 6/1979 | Probst ............................ 354/25 |

Primary Examiner—David C. Nelms
Attorney, Agent, or Firm—Charles J. Ungemach

[57] ABSTRACT

A radiation filter for use in a range determining system to reduce the effects of radiation falling on the edges of a radiation detector used in the system to a greater extent than radiation falling on the central portion of the detector.

11 Claims, 12 Drawing Figures

GRID SCAN RANGE FINDING APPARATUS

BACKGROUND OF THE INVENTION

The present invention relates to range finding equipment for use in apparatus such as still cameras or motion picture and television cameras and more particularly to an improvement to the type of range determination apparatus which utilizes two optical paths for forming two images on a pair of detectors with the relative spacing of the images on the detectors being indicative of the range to a remote object and in which a moving grating or grid structure is employed to periodically interrupt the images received by the detectors so that their outputs are variable electrical signals whose phase relationship becomes indicative of the range to the remote object.

In the art of automatic range finding equipment, a number of systems have been proposed for automatically determining the distance from an optical system to a remote object. One such system employs apparatus for the automatic parallax determination in connection with a stereoscopic optical system in which images of the object are focused upon two detectors from two separate optical transmission means that are spaced apart a distance forming the baseline of a triangulation scheme. If, for example, the object were at infinity, the images on the two detectors would be the same and the outputs of the detectors would be equal. If the object were to move closer to the system, then the image on at least one of the detectors would move with respect to the image on the other so that the output of the detectors would change indicating an "out-of-focus" condition. In order to detect the change of position of the image on one detector with respect to the other, it has also been proposed that a moveable grating, chopper, grid or prism be interposed in the light path to each detector so that the output of the detectors becomes a varying signal, for example, sinusoidal. At infinity, the phase of the two sinusoidal signals from the detectors would be coincident, but as the object moved closer to the optical system and one image moved with respect to the other, the phase of the signals from the detectors would change. It has further been proposed that phase detecting apparatus, connected to receive the outputs of the detectors, may be employed to produce a signal indicative of the difference in the images of the two detectors and thus of the range to the object. This signal may be used to adjust one of the optical systems to bring the images back into coincidence and the phase of the output signals from the detectors back into equality or the signal may be used to position an indicator or other device so as to provide an indication of the range to the object.

A difficulty has been encountered in the prior art systems due to what is known as "edge effects". A major cause of this is the artificial reduction in light from the subject being detected due to the limit or edge of the sensing or light measuring system. The scanning system will see or detect this limit or edge and produce a resulting "edge signal". The output signal will be a combination of the desired information signal and the edge signal. The combination signal can be significantly in error due to the combined edge component. The elimination of the edge signal improves the system performance and accuracy. Another edge effect problem occurs when one detector sees a slightly different scene area than the other one due, for example, to slight system misalignment or subject distance. If a bright object were just on the edge of the image on one detector but not on the edge of the other due, then the output of the one detector would be different than the output of the other even though the objects might be in a proper focus position.

SUMMARY OF THE INVENTION

The present invention overcomes this problem in the prior art by providing a filter in the light path to the detectors which filter has the greatest opacity along the edges with increasing transparency towards the middle. Thus, the scene area edges and objects, which are located near the edge of the image on the detectors, will have little or no effect on the output whereas those portions of the image in the central region of the detector will have a greater or maximum effect on the output. With such a filter, the errors which occur due to the "edge effects" are minimized or eliminated and the apparatus can produce an accurate indication of range.

DETAILED DESCRIPTION OF THE PREFERRED EMBODIMENTS

Figure 1:
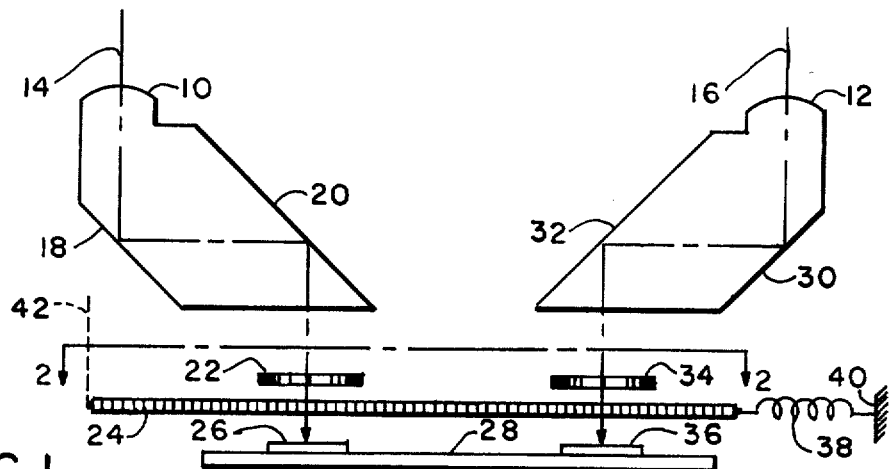
FIG. 1 shows a schematic representation of an optical system employing the present invention.

In FIG. 1, a pair of lenses 10 and 12 receive radiation from a remote object generally along paths shown as dot-dashed lines 14 and 16 respectively. The radiation along path 14 is reflected off of a first mirrored surface 18 and again off a second mirrored surface 20 after which it passes through a filter 22 and a moveable grating 24 to a radiation sensitive detector 26 mounted on a substrate 28. The radiation along path 16 is reflected off a first mirrored surface 30 and again off a second mirrored surface 32 after which it passes through a filter 34 and the moveable grating 24 to a second detector 36 also mounted on substrate 28. Moveable grating 24 is made of alternate transparent and opaque portions and is biased to the right in FIG. 1 by a spring 38 fastened to a fixed member 40. The left end of moveable grating 24 is connected by a mechanical connection shown by dashed line 42 to a mechanism (not shown) which may be, for example, a release mechanism for a camera. Upon release of the mechanism, which might occur by the pressing of the picture taking activator on a camera, moveable grating 24 will move to the right in FIG. 1 under the action of spring 38 so as to cause fluctuation of the light striking detectors 26 and 36. If the moveable grating 24 is composed of a sinusoidal grid, the outputs of detectors 26 and 36 will sinusoidal in a manner known in the art. The moveable grid 24 may be returned to its original starting position shown in FIG. 1 by a mechanism connected to dashed line 42 such as the film winding apparatus of the camera.

As shown in FIG. 1, light paths 14 and 16 are parallel and are focusing on an object at infinity. In this case, the images of the object appearing on detectors 26 and 36 will be substantially identical and the sinusoidal outputs from the detectors will be in phase. If the object were to move closer to the optical system, the images on detectors 26 and 36 will move so that the sinusoidal outputs therefrom will become out-of-phase by an amount which depends upon the distance of the object from the optical system. Detection of this phase difference and the amount thereof is an indication of the amount of displacement of the object from its infinity position and thus is indicative of range. Of course, the lenses 10 and 12 could be arranged so as to initially focus on an object at a near distance or some intermediate distance in which case the positions of detectors 26 and 36 on substrate 28 would be adjusted so that the images thereon would be substantially identical at that original distance and the phase difference that occurs when the object moves from that position would again be indicative of the range to the object.

Except for the filters 22 and 34, the system above-described is quite similar to prior art ranging systems. A difficulty has been encountered in such systems however when the scene being viewed by detector 26 along path 14 is not quite identical to the scene being viewed by detector 36 along path 16 or because of the other edge effects above described.

Figure 2:
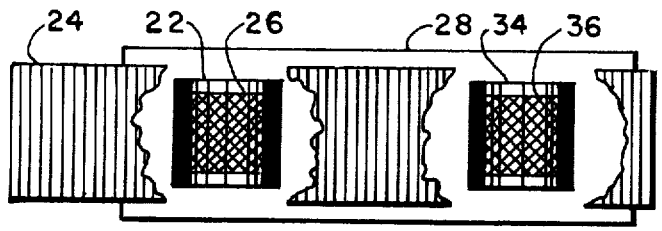
FIG. 2 shows a view of FIG. 1 taken along a section 2—2 thereof.

FIG. 2 shows a view of FIG. 1 taken along the section 2—2 thereof and it is seen that the pair of detectors 26 and 36, shown cross-hatched in FIG. 2, lie below the grid 34 which is shown cut away for clarity and that the pair of filters 22 and 34 are situated so as to extend over the entire area of the detectors 26 and 36 respectively. It is also seen in FIG. 2 that the filters 22 and 34 are constructed so as to be most opaque near the edges thereof but so as to become more and more transparent towards the middle thereof. With such an arrangement, light which would normally strike near the edges of detectors 26 and 36 will be blocked by the opacity of the filters 22 and 34 but light striking near the center of the detectors 26 and 36 will pass nearly unattenuated. By this means, the "edge effects" which may cause errors in the outputs of the detectors are substantially eliminated since they will have little or no effect on the outputs of the detectors having been blocked by the filters but the portions of the image which lie near the center of the detectors and which should be the same for both images, will have full effect on the detectors to produce an accurate output.

Figure 3A:
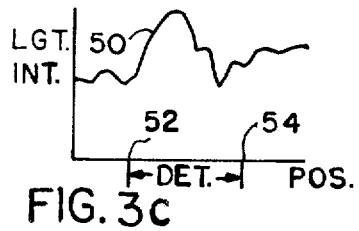
FIGS. 3a-3h are graphs showing the effects of various portions of the system of the present invention.
Figure 3B:
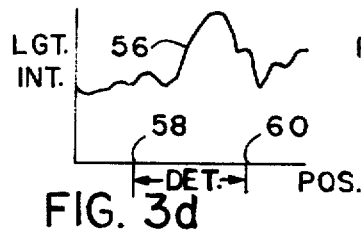

FIGS. 3a and 3b are graphs of light intensity versus position of the image in the area around the detectors 26 and 36 for a hypothetical scene being viewed. It is seen in FIG. 3a that the image luminance distribution, shown by curve 50, peaks in an area close to the center of the detector itself which is shown in FIG. 3a as lying between points 52 and 54. In FIG. 3b, the distribution curve, shown as line 56, is similar in shape to that of line 50 of FIG. 3a but lies somewhere further to the right in FIG. 3b so that it is centered more about the right hand portion of the detector position which lies between points 58 and 60 in FIG. 3b. The displacement of curve 56 in FIG. 3b with respect to the position of curve 50 in FIG. 3a shows that the object lies at a distance other than the preset base distance which in the present example is at infinity. If the object were, in fact, at infinity, curve 56 would be further to the left and would be centered around the detector area shown by points 58 and 60 in substantially the same position as that of curve 50 in FIG. 3a. The amount of displacement of curve 56 to the right in FIG. 3b is an indication of the range to the object since as the object moves closer and closer to the optical system, curve 56 will move further and further to the right in FIG. 3b. By detecting the amount of shift, a measure of the range to the object can be obtained.

Figure 3C:
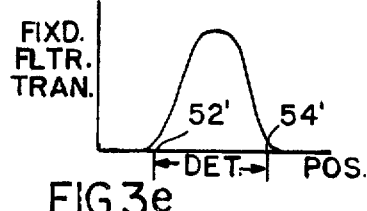
Figure 3D:
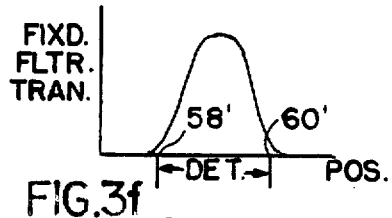

FIGS. 3c and 3d are graphs of transmissivity as a function of position for the filters 22 and 34 and it is seen in these figures that the amount of transmissivity is nearly zero at the edges of the detectors shown by points 52' and 54' in FIG. 3c and points 58' and 60' in FIG. 3d. It is also seen that near the center of the detector areas, the transmissivity is greatest so that radiation is blocked at the edges of the detector but the amount of blockage decreases until at the center there is substantially no blockage.

Figure 3E:
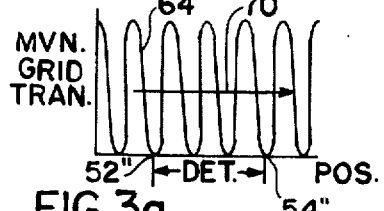
Figure 3F:
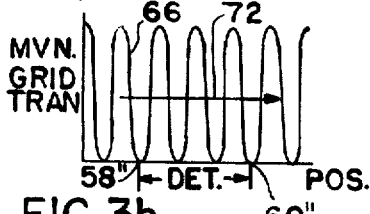

FIGS. 3e and 3f show transmissivity, identified as curves 64 and 66, as a function of position for the sinusoidal moving grid with respect to the detectors which are shown in FIG. 3e to lie between points 52" and 54" and in FIG. 3f between points 58" and 60". The moving grid moves in the direction shown by arrows 70 and 72 in FIGS. 3e and 3f respectively so that the amount of light reaching the detectors is modulated in a sinusoidal fashion.

Figure 3G:
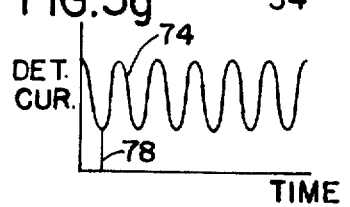
Figure 3H:
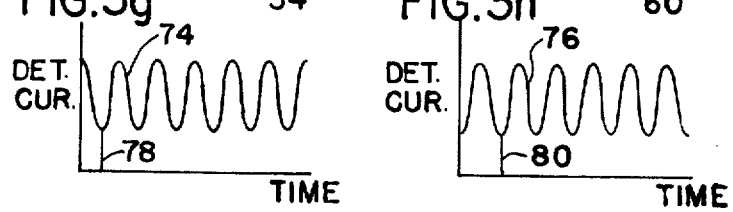

FIGS. 3g and 3h show the detector current output from detectors 26 and 28 as they would occur upon modulation by the moving grid 24. The detector current in FIG. 3g is shown by sinusoidal curve 74 and in FIG. 3h by sinusoidal curve 76. It is seen in FIGS. 3g and 3h that the curves, as plotted against the base time, are out of phase by an amount which may be measured between the first downward peak position shown as line 78 in FIG. 3g compared to the first downward peak position shown by line 80 of FIG. 3h. This phase difference will be indicative of the range to the object as is shown in FIG. 4.

Figure 4:
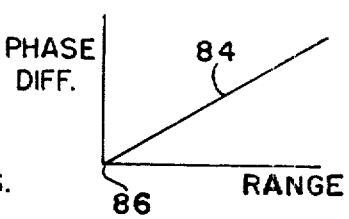
FIG. 4 is a graph showing variation of range with phase difference in the outputs of the detectors.

FIG. 4 shows a graph of the phase difference versus range and it is seen this is a straight line 84 extending from a zero point 86 upwards and to the right. Point 86 would correspond to an object at infinity where there is no phase difference and a point towards the end of line 84 would correspond to the object at a very close distance such as one meter, for example.

Figure 5:
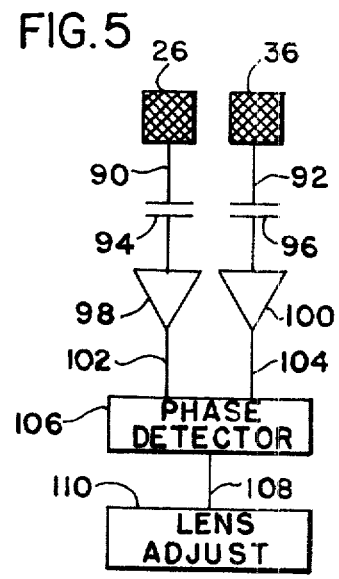
FIG. 5 is a block diagram of the circuitry used to produce an output indicative of range.

FIG. 5 shows a circuit for obtaining an output indicative of the range. In FIG. 5 the detectors 26 and 36 are shown as cross-hatched squares with outputs on lines 90 and 92 respectively. These lines are connected to capacitors 94 and 96 respectively and thence to amplifiers 98 and 100. As mentioned previously, the outputs of detectors 26 and 36 will be fluctuating signals such as sinusoidal currents indicated as in FIGS. 3g and 3h which currents will be amplified by amplifiers 98 and 100 to produce signals on lines 102 and 104 to a phase detector $1\phi6$. Phase detector 106 may be any standard phase detector arrangement which produces an output on line 108 of magnitude that varies with the phase difference between the signals from detectors 26 and 36. This signal is presented to an output device shown as a lens adjustment mechanism $11\phi$ when the apparatus is to be used for positioning the taking lens of a camera. Alternately, the apparatus 110 may be an indicator which will provide a visual indication of the range to the remote object.

It is therefore seen that I have provided a system for determining the range to a remote object which overcomes the problem of "edge effects" and produces an accurate output. Many obvious changes will occur to those skilled in the art as, for example, while I have shown a moving grid 24 in the form of a linearly moving sinusoidal grating, the grating may be of any desired configuration and may be a circular grid or a prism rotatably mounted to provide the desired modulation of light to the detectors 26 and 36. The phase detector 1φ6 of FIG. 5 may detect the phase by determining the distance between peaks or cross over points of the two currents such as shown in FIGS. 3g and 3h or, if desired, the grating 24 may be made so as to have variable spacing from one end to the other in whichcase the phase detector could detect the position at which the two currents were in phase as the grating moved to the right in FIG. 1. Also, if desired, the lens adjust mechanism 110 in addition to positioning the taking lens of a camera could operate to move the optic system such as lens 12 of FIG. 1 in a rotatable fashion and thus bring the images on detectors 26 and 36 back into coincidence rather than to just produce an output indicative of the range without adjusting the images on the detectors. These and other alterations will occur to those skilled in the art and I do not wish to be limited by the specific disclosures used in connection with the preferred embodiment described herein. I intend only to be limited by the following claims.

The embodiments of the invention in which an exclusive property or right is claimed are defined as follows:

1. Apparatus for use in a radiation responsive system which includes radiation responsive means having end portions and a middle portion and operable to produce an output signal indicative of the amount of radiation received thereby, image producing means operable to produce an image of a remote object on the radiation responsive means and modulating means mounted in the path of radiation from the remote object to the radiation responsive means and operable to vary the radiation received by the radiation responsive means so that the output signal varies in a predetermined manner, the improvement comprising:

radiation filtering means mounted in the path of radiation from the remote object to the radiation responsive means and operable to at least partially attenuate radiation transmitted to the radiation responsive means in such a manner that the attenuation received by the end portions is greater than the attenuationof radiation received by the middle portion.

2. Apparatus according to claim 1 wherein the radiation responsive means comprises first and second radiation detectors operable to produce a first and second output signal respectively, whereinthe image producing means is operable to produce an image of the remote object on both of the radiation detectors and the relative position of the images on the first and second radiation detectors changes with the range to the remote object, wherein the modulating means is operable to vary the radiation received by the first and second radiation detectors and wherein a characteristic of the first and second output signals is indicative of the range to the remote object.

3. Apparatus according to claim 2 wherein the predetermined number of varying the output signal is periodic and the characteristic of the signals is a phase difference and further including phase detection means connected to the first and second radiation detectors to receive the output signals and to produce a resultant signal indicative of the range to the remote object.

4. Apparatus according to claim 3 wherein the predetermined manner of varying the output signal is sinusoidal.

5. Apparatus according to claim 3 wherein the radiation responsive system is a camera having a taking lens and including further means connected to said phase detection means to receive the resultant signal and to position the taking lens in accordance therewith.

6. Range determination apparatus comprising in combination:

first and second radiation detectorseach havinga surface including a pair of end portions and a middle portion, said first and second detectors operable to produce first and second output signals respectively indicative of the radiation received thereby;

first and second image forming means positioned in first and second radiation paths from a remote object to said first and second detectors respectively and operable to produce first and second images of the remote object on the surfaces of said first and second detectors respectively, the first and second images occupying a first relative position when the remote object is at a predetermined range, the relative position changing from the first relative position as the range of the remote object changes from the predetermined range;

modulating means positioned in the first and second radiation paths to modulate the radiation received by the first and second detectors so that the first and second output signals are modulated and contain a characteristic which varies with the relative position of the first and second images; and filter means positioned in the first and second radiation paths and operable to attenuate the radiation received at the end portions of the surface of the first and second detectors to a greater extent than the middle portions.

7. Apparatus according to claim 6 wherein the modulation of modulating means is periodic and the characteristic is phase difference between the first and second output signals.

8. Apparatus according to claim 7 including phase detection means connected to the first and second detectors to receive the first and second output signals and operable to produce a resultant signal indicative of the phase difference between the first and second outputsignals.

9. Apparatus according to claim 8 wherein the range determination apparatus is connected to a camera having a taking lens and including motive means connected to the phase detection means to receive the resultant signal and operable to position the taking lens in accordance therewith.

10. Apparatus according to claim 6 wherein the modulating means comprises a member having alternately opaque and translucent portions.

11. Apparatus according to claim 6 wherein the radiation filter comprises a mask which has a variable density with the greatest density being near the edges thereof and gradually having less density toward the middle portion thereof.

* * * * *